Dec. 2, 1941.    W. J. COULTAS ET AL    2,264,565
CORN PICKER
Filed Jan. 28, 1939    7 Sheets-Sheet 2

INVENTOR.
WILBUR J. COULTAS
NORMAN F. ANDREWS
BY
*Brown, Jackson, Boettcher & Dienner*
ATTORNEYS

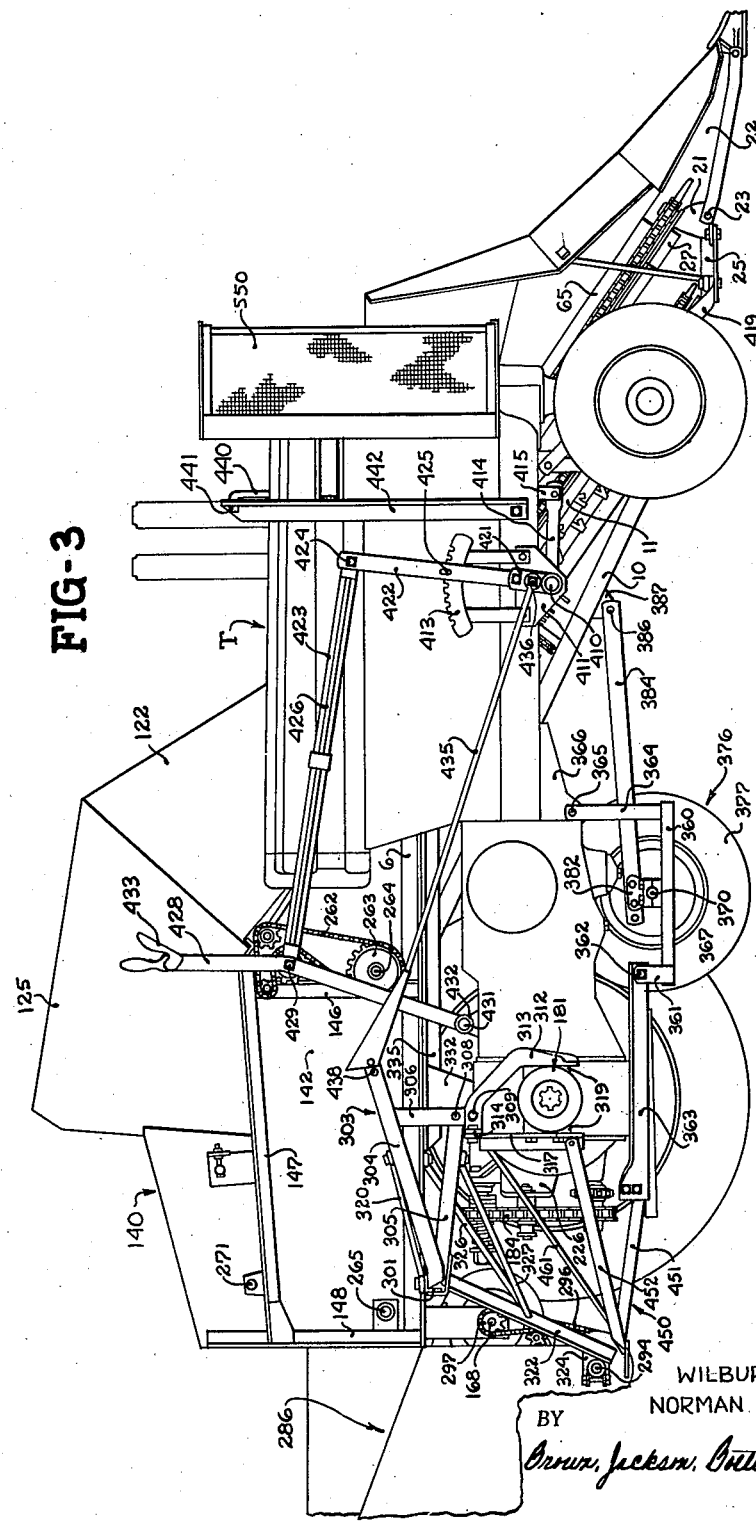

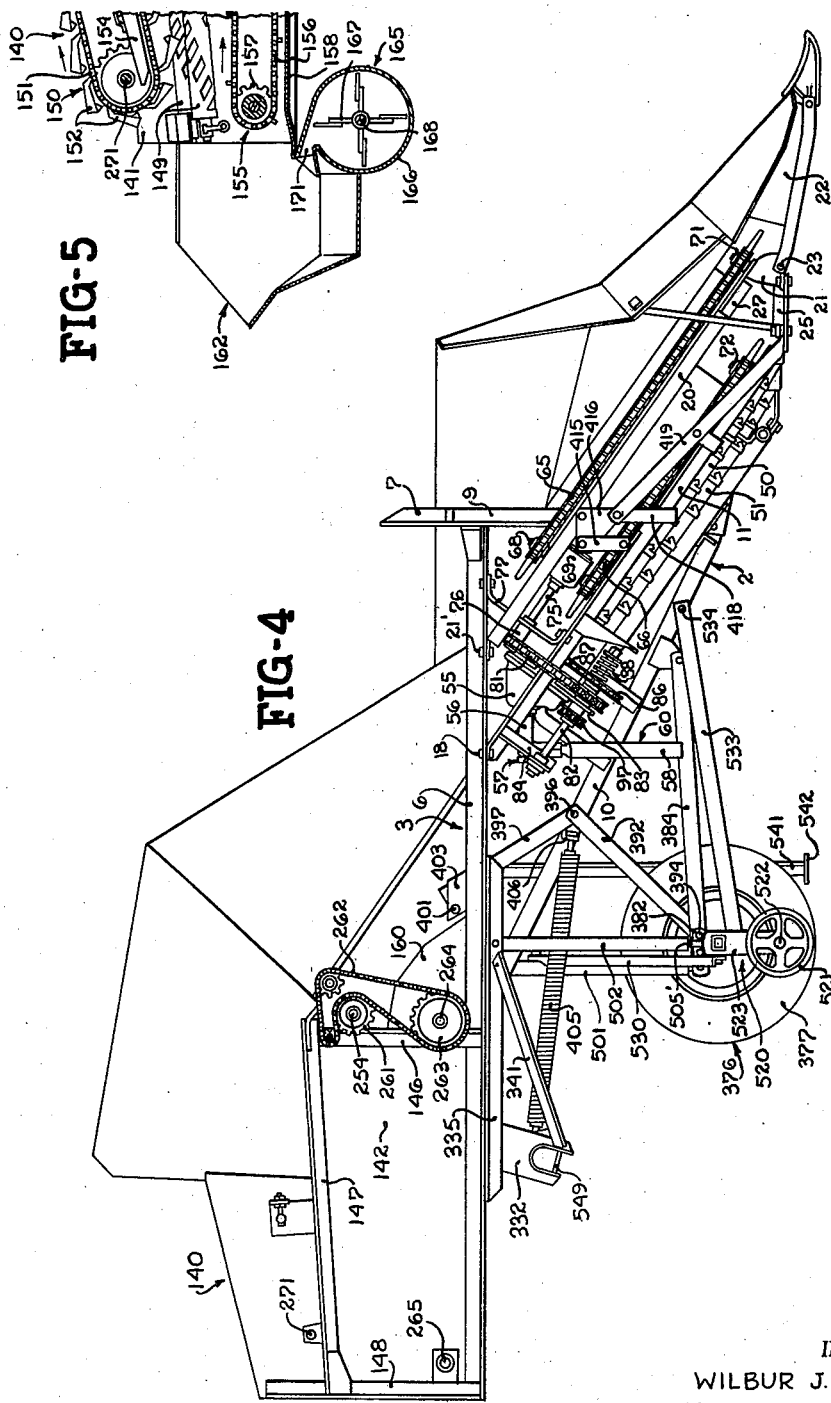

Dec. 2, 1941.   W. J. COULTAS ET AL   2,264,565
CORN PICKER
Filed Jan. 28, 1939   7 Sheets-Sheet 5

INVENTOR:
WILBUR J. COULTAS
NORMAN F. ANDREWS
BY
Brown, Jackson, Boettcher & Dienner
ATTORNEYS.

Dec. 2, 1941.  W. J. COULTAS ET AL  2,264,565
CORN PICKER
Filed Jan. 28, 1939   7 Sheets-Sheet 6

INVENTOR.
WILBUR J. COULTAS
NORMAN F. ANDREWS
BY
ATTORNEYS

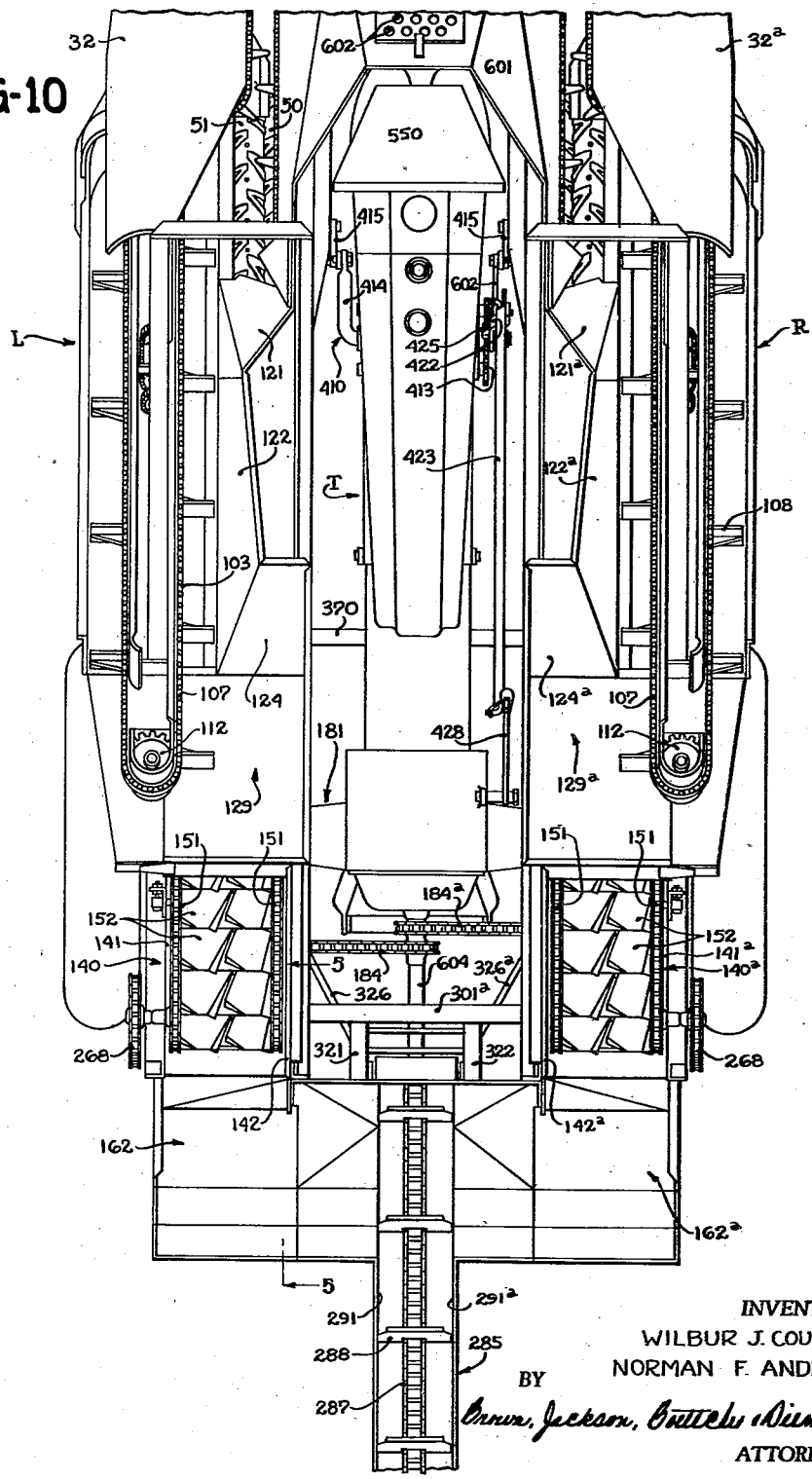

Patented Dec. 2, 1941

2,264,565

UNITED STATES PATENT OFFICE 2,264,565

CORN PICKER

Wilbur J. Coultas and Norman F. Andrews, Moline, Ill., assignors to Deere & Company, Moline, Ill., a corporation of Illinois Application January 28, 1939, Serial No. 253,386

34 Claims. (Cl. 56—18)

This invention relates generally to agricultural implements and more particularly to harvesting machines of the type known as corn pickers, the function of which is to snap the ears of corn from the corn stalks, remove the husks and silks and deliver the cleaned ears into a wagon or other means to receive the same. Many corn pickers are arranged for tractor operation, and the present invention is particularly concerned with corn pickers that are adapted to be mounted on and supported, at least partially, by the tractor.

Heretofore, corn pickers have been manufactured to pick corn either from one row or two rows. However, the single row picker was an entirely different implement from the two row picker, and neither was furnished except as a separate and complete machine. Hence, if a farmer after having used a one row picker decided that he needed a two row picker, he would be required to dispose of or discard his one-row machine and buy an entirely different implement. One of the principal objects of this invention is the provision of a corn picker construction in which a one-row picker unit may be purchased and, if the farmer so desires, an auxiliary unit may be acquired later and combined with the single row unit originally acquired to make up a two-row machine, thus eliminating any necessity for disposing of the one-row unit when changing over from one-row operation to two-row operation.

Specifically, it is an object of this invention to provide a complete one-row picker unit which is adapted to be mounted on the left side of the tractor, and to provide further a right hand picker unit which can be mounted at any time at the right side of the tractor and combined with certain parts of the first mentioned unit to complete a two-row machine.

Another important feature of this invention, having particularly to do with the provision of a single row picker unit, resides in the construction of new and improved means for supporting a single row picker on its own wheels and the provision of simplified means for attaching the single row unit to the tractor. Heretofore, single row corn pickers have not been arranged to be transported or moved about as a unit but in mounting the same for use on a tractor it was practically necessary to disassemble the unit and individually attach the various component parts to the tractor. As will be obvious, this entailed time consuming operations and, further, involved arduous labor in bringing the various parts into their proper positions and holding them in place while completing the attachment.

According to the present invention, a single row picker unit is provided which is equipped with its own supporting wheels, one of which supports the major portion of the weight of the unit when it is attached to the tractor and the other of which is in the nature of an auxiliary or transport wheel used only when the unit is detached; but when the unit is detached, it is supported in a stable manner as a whole and can be moved from place to place by one man. To this end it is a feature of this invention to provide a unit that is balanced on its supporting wheels, whereby it may be pushed about by grasping one end of the unit and moving it in much the same manner as a two wheeled cart is moved. In this connection it is another feature of this invention to provide a safety adjustable brace at the side of the main wheel opposite the transport wheel to eliminate any likelihood of the unit tipping over when it is moved about.

In connection with the means provided by the present invention for transporting a single row picker on its own wheels, it is a further feature of this invention to provide means facilitating the attachment of the unit to the tractor. More particularly, we provide adjustable jacks at either side of the machine, not only to adjust the balance of the unit on its own carrying wheels but also for aligning the frame of the picker with, and lowering it for connection to, the tractor body.

A still further feature of this invention is the provision of a driving means operatively connected to the power takeoff or the tractor and mounted by suitable brackets on the tractor axle housing, and the provision of means on the housing of the driving means for pivotally supporting the picker unit, thereby eliminating any necessity for additional brackets or other means separately attached to the tractor for receiving the supporting pivot of the picker unit.

Still further, an additional feature of this invention is the provision of improved adjusting mechanism for raising and lowering the front end of the picker unit relative to the tractor. Also, this invention contemplates the provision of tilting mechanism for the single row picker unit which is especially adapted to serve also as the tilting means for the other or right hand unit when the latter is utilized to make a two-row picker, and it is still further a feature of this invention, when using only the left hand picker unit, to provide associated means connected to the wagon elevator frame for holding the latter in proper alignment with the picker unit in any adjusted position of the latter.

An additional feature of this invention is the provision of simplified mechanism for driving the picker rolls, the gatherer chains and husking rolls from the power takeoff of the tractor.

These and other objects and advantages of the present invention will be apparent to those skilled in the art after a consideration of the following detailed description of the preferred structural embodiment of our invention.

In the drawings:

Figure 3 is a view of the right side of the machine shown in Figure 1, illustrating in particular the tilting means for raising and lowering the front end of the corn picker unit, the right hand rear tractor wheel being removed;

Figure 4 is a view of the right side of the corn picker unit shown in Figure 1 when the unit is arranged for transport and is supported as an entirety on its own supporting wheels;

Figure 5 is a fragmentary sectional view, taken along the line 5—5 of Figures 1 and 10, showing certain details of the husking means;

Figure 1:
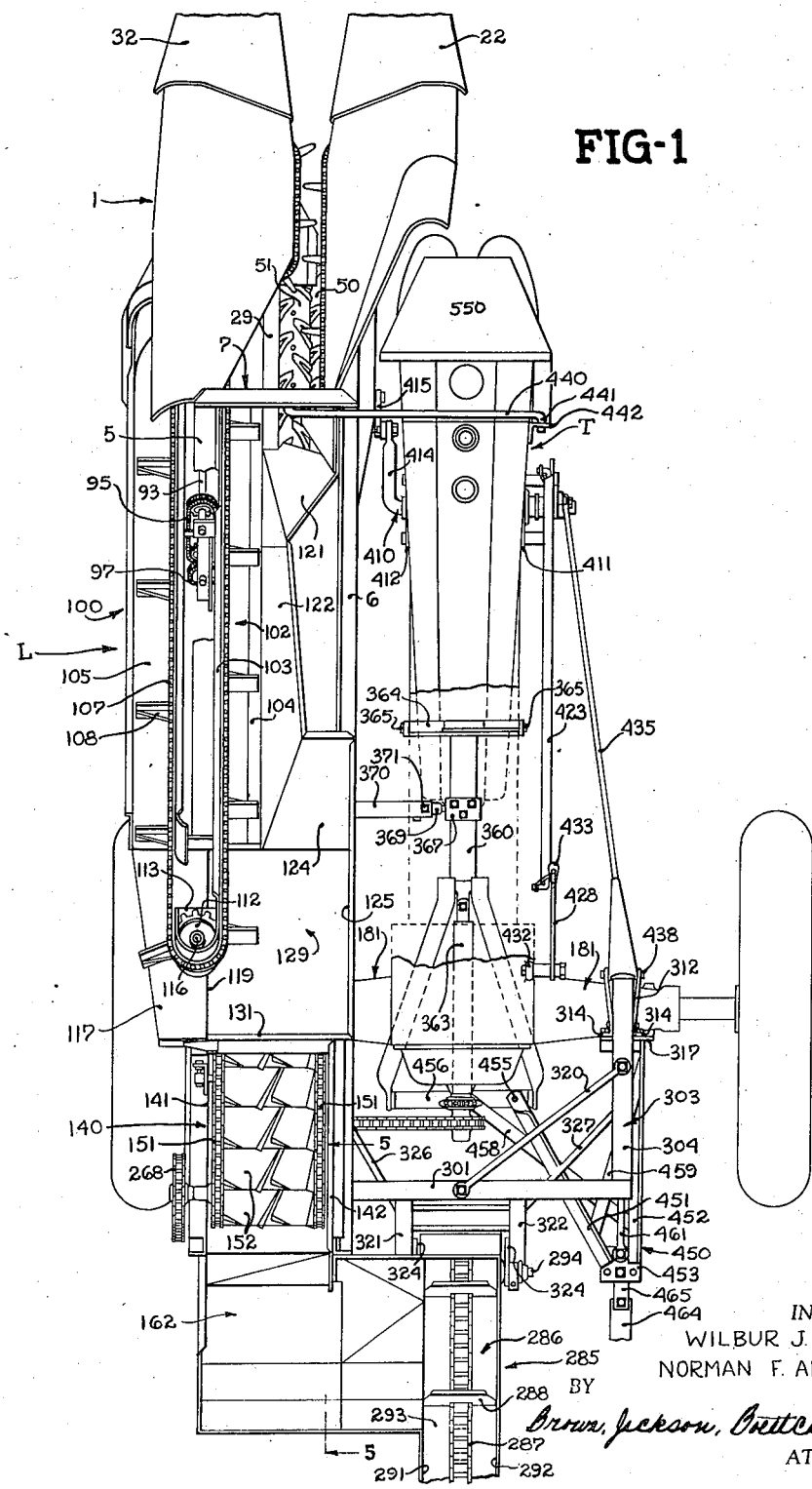
Figure 1 is a plan view of a tractor and a single-row corn picker unit attached thereto and ready for operation.
Figure 9:
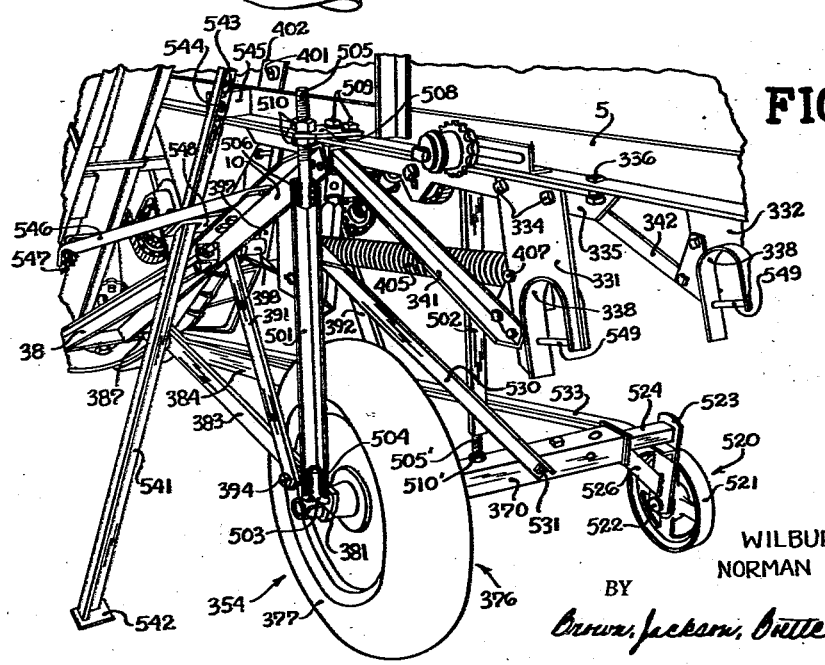

Figure 9 is a fragmentary perspective illustrating the transport mechanism by which the corn picker may be handled as a unit when detached from the tractor and held in position when being attached to the tractor; and Figure 10 is a view similar to Figure 1 but illustrating the manner in which the machine may be converted from a one-row corn picker into a two-row corn picker by the addition of a right hand unit.

Referring now to the drawings, it will be seen that the corn picker unit indicated in its entirety by the reference character L is shown in Figure 1 as comprising, in common with other types of corn pickers, such as the one shown in our prior patent, issued June 11, 1935, Patent 2,004,720, four component parts; namely, snapping rolls and associated gatherer chains for removing the ears of corn from the stalks, a first elevator receiving the picked ears of corn and moving them rearwardly, a husking unit arranged to receive the ears from the elevator and adapted to remove the husks, silks and the like from the ears, and a wagon elevator receiving the ears of corn from the first elevator hopper and conveying them to a wagon drawn through the field with the corn picker.

Figure 2:
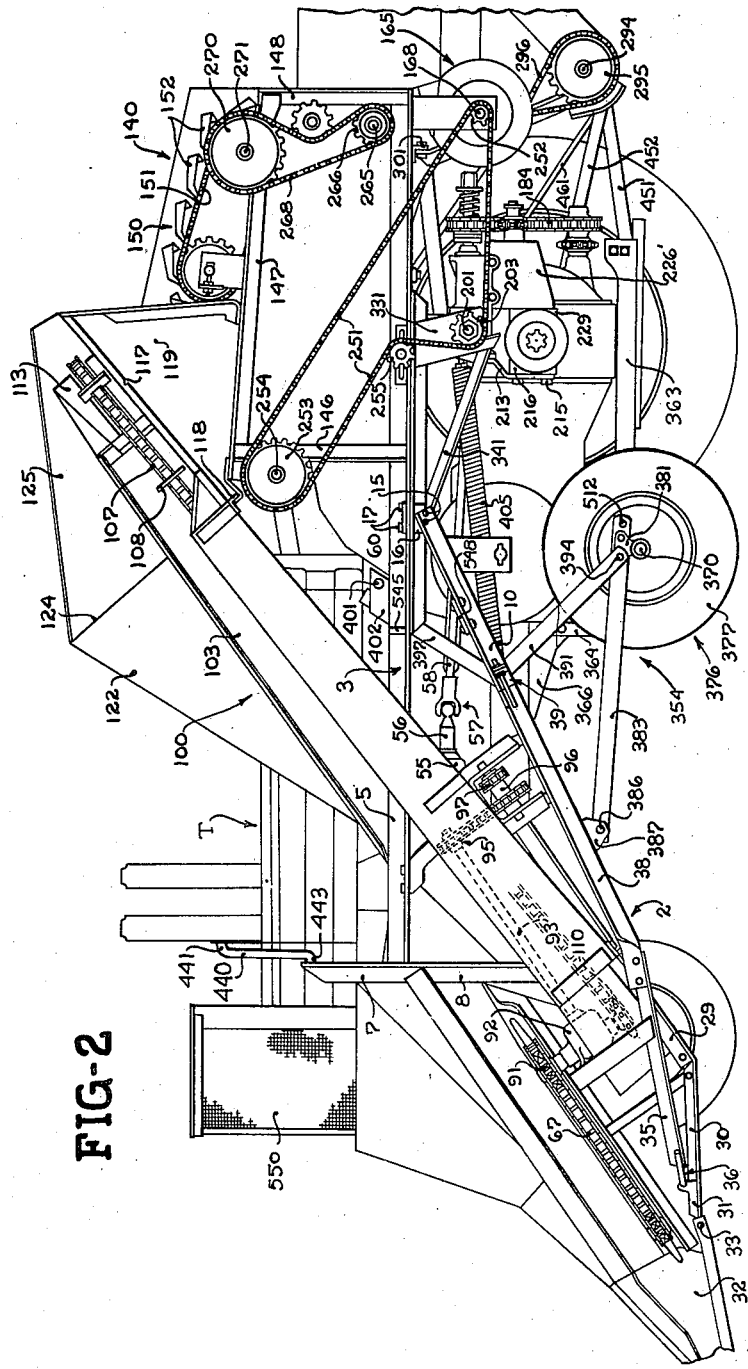
Figure 2 is a view of the left side of the machine shown in Figure 1, the left rear wheel of the tractor being removed to provide a better view of the parts.

Referring now more particularly to Figures 1 to 4, inclusive, the snapping unit is indicated in its entirety by the reference numeral 1 and is supported upon a downwardly and forwardly extending framework 2 which forms a rigid part of the corn picker frame, indicated in its entirety by the reference numeral 3. The latter includes two generally parallel angles 5 and 6 (Figures 1, 2 and 4) which are connected together at their forward ends by an arch angle 7, the lower ends 8 and 9 of which are riveted or otherwise secured to the downwardly extending angles 10 and 11 which form the principal parts of the snapping roll frame 2. The upper rear end of the outer picker frame bar 10 is secured, as by bolts 15, to a bracket 16 that is fastened by bolts 17 to the horizontal flange of the main frame bar 5, as best shown in Figure 2, and the upper rear end of the inside frame bar 11 (Figure 4) is secured by a bolt 18 to the horizontal flange of the inside frame angle 6. Another downwardly and forwardly disposed frame angle 20 is bolted at 21' to the horizontal flange of the inside frame angle 6, the angle 20 being disposed generally parallel with respect to the angle 11 and connected at its lower end to a bracket 21 to which the outer gatherer point 22 is pivoted, as at 23. Extending rearwardly from the bracket 21 is a short angle 25 which is bolted to the lower end of the angle 11. A suitable bracket or other connecting means is disposed between the intermediate portion of the angle 20 and the adjacent part of the leg 9 of the arch angle 7. An inner angle 27 extends upwardly and rearwardly from the bracket 21 to the arch angle 7 inwardly of the angle 20, the latter being spaced therefrom at its intermediate portion but connected at its lower end thereto by suitable adjusting means (not shown). An outer or left hand snapping roll angle 29 (Figures 1 and 2) is disposed in generally parallel relation to the inner or right hand angle 11 and is similarly connected at its upper end to the frame bar 5 and at its lower end to a forwardly extending angle 30 which at its forward end is secured to a bracket 31 opposite the bracket 21 (Figure 4) to which the left hand gatherer point 32 is pivoted, as at 33. A front adjustable angle brace 35 is disposed laterally outwardly of the left hand snapping roll angle 29 and is adjustably secured, as at 36, to the bracket 31. The rear end of the angle brace 35 is bolted or otherwise secured to the front end of a rear adjustable angle brace 38 which, at its rear end, is adjustably secured, as at 39, to the frame angle 10.

The above described parts constitute the principal portions of the framework for supporting the snapping rolls, gatherer chains and driving mechanism therefor. The snapping rolls are indicated by the reference numerals 50 and 51 (Figures 1 and 4) and are journaled at their lower ends in suitable bearings carried, respectively, adjacent the lower ends of the snapping roll angles 11 and 29. The upper ends of the snapping rolls are supported in a gear housing 55 which is fixed in any suitable manner to the upper ends of the angle bars 11 and 29. The housing 55 encloses suitable gearing by which the snapping rolls are driven, and the aforesaid gearing is driven by a drive shaft 56 which is connected by universal joint 57 to one section 58 of a telescoping drive shaft indicated in its entirety in Figure 2 by the reference numeral 60. In Figure 4, the drive shaft section 58 is shown as hanging downwardly from the snapping roll drive shaft 56 since the picker is disconnected from the tractor and supported on its own wheels.

The inside or right hand gatherer chains are indicated at 65 and 66 in Figure 4, and are supported more or less conventionally upon the associated parts of the snapping roll framework. The outer or left hand gatherer chain is indicated at 67 in Figure 2. The inner or right hand gatherer chains 65 and 66 are supported at their upper ends on suitable sprockets mounted upon a shaft 68 that is journaled in a gatherer chain drive housing 69 supported by a suitable bracket on the inner leg 9 of the arch angle 7. The lower ends of the gatherer chains 65 and 66 are mounted on suitable sprockets 71 and 72, the former being supported at the lower end of the angle 27 and the latter sprocket being journaled at the lower end of the frame angle 11. A drive shaft 75 for the gatherer chains extends upwardly and rearwardly from the housing 69 and is supported by suitable bearing means 76 in a bracket 77 which is fixed at its lower end to the angle 11 and at its upper end to the horizontal flange of the main frame angle 6, as best shown in Figure 4. The bracket 77 is also secured by a part, not shown, to the gatherer angle 20.

The gatherer chain drive shaft 75 is driven by means of a sprocket chain 81 which is trained over a sprocket fixed to the upper end of the shaft 75 and a similar sprocket carried by a countershaft 82 which is supported in a plate 83 fixed to the snapping roll drive housing 55 and in an angle bracket 84 fixed to the upper end of the frame angle 11. The shaft 82 carries a drive sprocket 86 which receives a drive chain 87 that is trained over a sprocket on one of the snapping roll shafts. A slip clutch mechanism 88 connects the sprocket 86 to the shaft 82.

As best shown in Figure 2, the left hand or outer gatherer chain 67 is supported at its upper end on a drive sprocket 91 which is carried on a suitable shaft which extends from a drive housing 92. Through suitable beveled gears in the housing 92, the sprocket 91 is driven from a drive shaft 93 that extends from the housing 92 upwardly along the picking rolls. The shaft 93 is driven through a suitable chain and sprocket connection 95 from a double sprocket member 96 which, in turn, is driven by a transverse sprocket chain 97 that extends underneath the snapping roll drive housing 55 and the elevating mechanism associated therewith, also shown in Figure 4. This end of the transverse sprocket chain 97 is carried upon and driven by a sprocket secured in any suitable manner to the shaft 82.

From the description so far it will be apparent that the rotation of the drive shaft 56 for the snapping roll drive gear housing 55 drives not only the snapping rolls but also the gatherer chains and that the transverse driving sprocket chain 97 is disposed underneath the other parts of the snapping roll unit whereby it is protected from leaves, stalks and the like which sometimes interfere with the proper operation where the opposite gatherer chain is driven by a sprocket connection extending across the upper portion of the snapping unit.

The elevating mechanism for receiving the ears of corn snapped from the stalks as the machine transverses the field and for moving the ears rearwardly into the husking mechanism is indicated in its entirety by the reference numeral 100 in Figures 1 and 2. The elevator 100 extends directly rearwardly and is designed to convey the ears of corn to the husking rolls by the most direct route. The elevator 100 includes a conveyor chute 102 which consists of a pair of side boards 103 and 104, the former being disposed vertically and fastened to the inside portion of the outer leg 8 of the arch angle 7 while the latter flares laterally inwardly slightly. The return chute for the elevator is indicated at 105 and is of similar construction. Operating within the conveyor and return chutes is an elevator chain 107 which carries uniformly spaced flights or paddles 108. The lower end of the elevator chain 107 is trained over a drive sprocket 110 (Figure 2) which is fixed to the lower end of the shaft that carries the outer or left hand gatherer chain drive sprocket 91, and the upper end of the elevator chain is trained over a sprocket 112. A guide 113 for the idler sprocket 112 is secured to or forms a part of the elevator side sheet 103. The idler sprocket 112 is supported for rotation on a suitable shaft 116 carried upon a supporting plate 117 which, in turn, is secured at its lower end to an angle 118 (Figure 2) and at its inner side to a side sheet 119 which forms a part of the husking unit described below. A top sheet 121 (Figure 1), which forms a part of the gatherer unit, serves to guide the snapped ears of corn into the elevator 100, and the latter unit includes a side sheet 122 which is joined to the member 121 and extends rearwardly and connects with a plate 124 which extends laterally inwardly, or to the right as viewed in Figure 1, the latter plate being connected to a sheet 125 that forms the right side of the hopper, indicated at 129, that leads to the husking unit, the left side of the hopper being formed by the sheet 119 (Figure 2) and completed by a rear plate 131 (Figure 1).

The husking unit is indicated in its entirety by the reference numeral 140. This unit consists of side plates 141 and 142 supported on the main frame angles 5 and 6 and connected to and disposed below the hopper sheets 118 and 125. Each of the sides 141 and 142 includes suitable reinforcing frame angles 146, 147 and 148 (Figures 2 and 3) suitably bolted or otherwise secured to the frame angles 5 and 6. Disposed between husker sides 141 and 142 are two pairs of husking rolls 149 (Figure 5) supported by suitable bearings in slightly rearwardly inclined position. Disposed above the husking rolls 149 in an ear retarder 150 which includes a pair of sprocket chains 151 carrying suitable retarder plates 152 connected by rods to the sprocket chains 151. Each of the retarding plates 152 carries an inner arm which operates in conjunction with a pair of ear retarder compression arms 154 which control the positions of the ear retarder plates 152 as they pass over the husking rolls 148 when the chains 151 are driven in the direction of the arrow shown in Figure 5.

Below the husking rolls 149 is a conveyor 155 which includes a pair of chains 156 running over sprockets 157 in the direction of the arrow shown in Figure 5. The function of the conveyor 155 is to convey the husks and silks forwardly, finally discharging them onto the ground through a hood 150 (Figure 4). The lower run of the husk conveyor 155, which moves rearwardly over the bottom sheet 158 (Figure 5), serves to move any shelled kernels of corn, which drop through the husking rolls and through the conveyor 155, into a hopper 162 which is disposed at the rear end of the husking unit 140 to receive the ears of corn discharged over the rear ends of the husking rolls, the hopper 162 forming a part of the wagon elevator carried at the rear of the tractor as will be described below. A fan 165 is mounted below the rear or discharge end of the husking unit and includes a housing 166 and a rotatable fan 167 mounted on a fan shaft 168. The discharge portion of the fan housing 166 is indicated at 171 and it will be noted that the blast of air from the fan housing of the unit 165 is directed upwardly and rearwardly and that the ears of corn and any kernels discharged by the conveyor 155 fall through the air blast into hopper 162. Thus, the fan 165 blows any loose husks, silks, dirt and the like out over the wagon elevator hopper 162, thus assuring clean corn being delivered to the wagon elevator.

Figure 6:
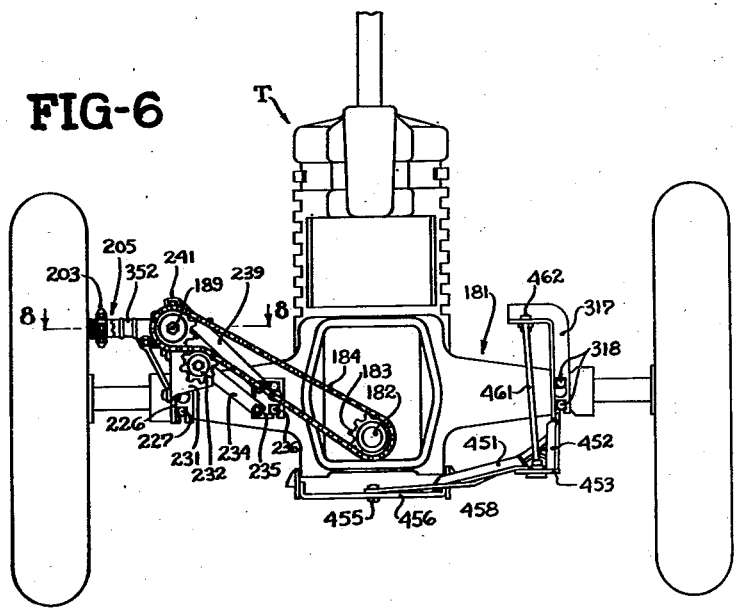
Figure 6 is a rear view of the driving mechanism for the left hand corn picker unit, this view also showing the wagon hitch and wagon elevator support angle at the right side of the tractor.
Figure 7:
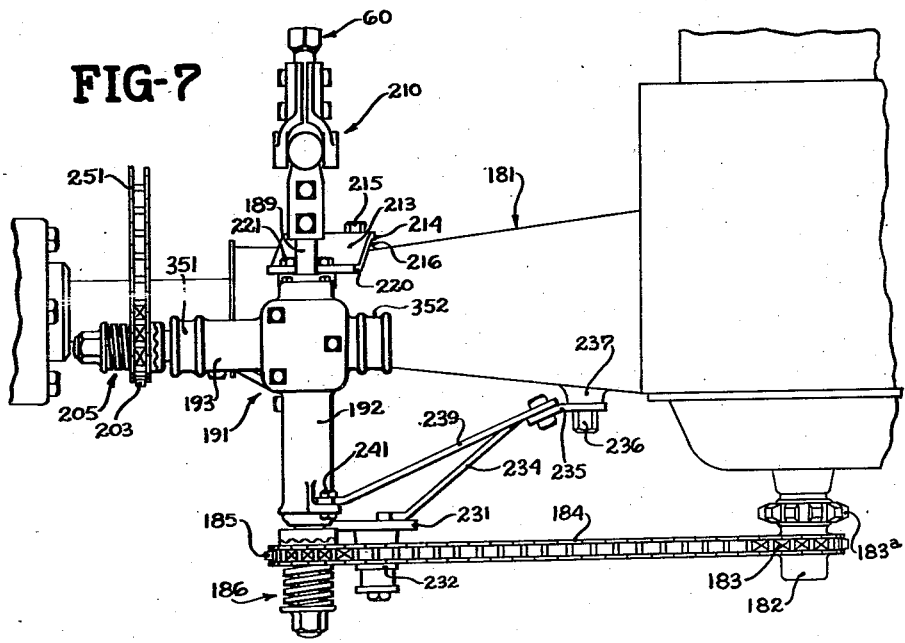
Figure 7 is a fragmentary plan view, taken at an enlarged scale, of the drive mechanism shown in Figure 6.
Figure 8:
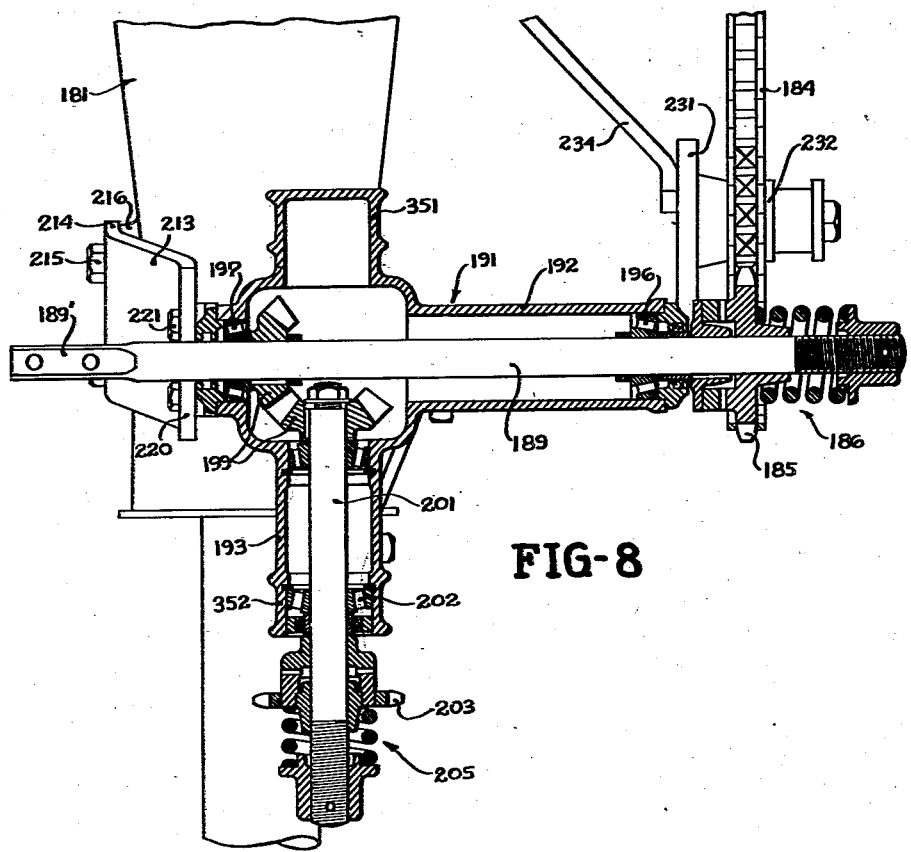
Figure 8 is an enlarged horizontal section taken along the line 8—8 of Figure 6.

Power for driving the snapping rolls, the first elevator and the husking unit is derived from the tractor. Referring now more particularly to Figures 6, 7 and 8, the tractor upon which the picking unit is mounted is indicated by the reference character T and includes a rear axle 181 from which a power takeoff shaft 182 extends rearwardly. The latter carries a driving sprocket 183 over which a chain 184 is trained. The chain 184 is best shown in Figure 6, extends upwardly and to the left and is trained over a sprocket 185 connected by a slip clutch mechanism 186 to a main shaft 189. The latter extends forwardly through a drive shaft housing 191, the latter having a sleeve extension 192 receiving the shaft 189 and a second sleeve extension 193 extending laterally outwardly, or to the left as viewed in Figures 6 and 7. The main shaft 189 is supported in the housing 191 by a bearing unit 196 at the outer or rear end of the sleeve extension 192 and by a similar bearing unit 197 at the opposite portion of the housing 191. The main shaft 189 extends through the housing 191 and has a squared end 189'. A pair of bevel gears 199 are disposed within the housing 191, one being fixed to the main shaft 189 and the gear meshing therewith being fixed at the inner end of a transverse shaft 201 which extends laterally outwardly through the sleeve extension 193, being supported at this end by a bearing unit 202. This outer end of the shaft 201 receives a driving sprocket 203 which is connected to the shaft by a slip clutch mechanism 205. As best indicated in Figure 2, the drive shaft 60 extends rearwardly from the shaft 56 for the snapping rolls and, as indicated in Figure 7, receives one part of the universal joint indicated in its entirety by the reference numeral 210, the other part being bolted or otherwise secured to the squared portion 189' (Figure 8) of the main shaft 189. Thus, when the tractor motor is connected to drive the power takeoff shaft 182, the sprocket chain 184 drives the shaft 189, and the latter in turn drives the power shaft 60 by which the snapping rolls, gatherer chains and elevator conveyor 107 are driven.

The drive housing 191 is supported firmly and rigidly on the left part of the tractor rear axle housing 181 by a front bracket 213 (Figures 2, 7 and 8), the lower portion 214 of which is provided with keyhole slots to receive clamping bolts 215 which are screwed into tapped lugs 216 that form a part of the rear axle housing at the forward side thereof. The upper portion 220 of the bracket 213 is apertured to receive bolts 221 which screw into the lower portion of the drive housing 191 below the front end of the main shaft 189 that is journaled for rotation therein. The drive housing 191 is also supported by a rear bracket 226 (Figure 6) which also has means in the nature of keyhole slots receiving a pair of clamping bolts 227 screwed into tapped lugs 229 (Figure 2) similar to the lugs 216 mentioned above. A part of the bracket, indicated at 226a in Figure 2, extends rearwardly and supports or serves as a plate 231 upon which tightener sprocket 232 is adjustably mounted. A drive housing brace 234 (Figures 6 and 7) extends downwardly and forwardly and is connected to a bracket 235 that is secured by a pair of bolts 236 to an inner axle housing lug 237. The bracket 235 also has keyhole slots receiving the attaching bolts 236. An upper brace 239 is bolted at its lower end to the bracket 235 and to the outer portion of the sleeve extension 192 of the drive housing 191, as indicated at 241.

A sprocket chain 251 is trained over the sprocket 203 and extends rearwardly to a sprocket 252 secured to the left hand or outer end of the fan shaft 168 (Figure 2). Also, the chain 251 extends upwardly to a drive sprocket 253 which is fixed to a shaft 254 that drives the husking rolls 149 (Figure 5) through suitable bevel gear sets at the forward ends of the husking rolls. An adjustable idler 255 is mounted on the frame bar 5 for sliding movement and serves to provide means by which the proper tension is maintained in the driving sprocket chain 251.

A sprocket 261 (Figure 4) at the opposite end of the shaft 254 drives a chain 262 which is trained over a sprocket 263 which is fixed to a shaft 264 over which the chains 156 (Figure 5) of the husk conveyor are trained. Suitable shields (not shown) are provided for enclosing the drive chains 251 and 262. The shaft upon which the rear sprockets 157 supporting the husk conveyor chains 156 are carried is indicated in Figures 2 and 5 by the reference numeral 265, and the left hand or outer end of this shaft supports a sprocket 266 (Figure 2) over which a sprocket chain 268 is trained. The sprocket chain 268 drives a sprocket 270 that is secured to a shaft 271 upon which the sprockets supporting the chains 151 of the ear retarder 150 are fixed.

Thus, as described above, power from the power takeoff shaft 182 of the tractor is delivered to the drive housing 191, and the main shaft of the latter transmits power through the shaft 60 to the snapping rolls and associated gatherer chains and first elevator. The husking unit, the ear retarder and the fan 165 are driven by suitable connections from the sprocket 203 at the outer end of the shaft 201 (Figure 8).

The wagon elevator, which includes the hopper 162 (Figure 5) mentioned above as receiving the husked ears of corn from the husking unit 140, is indicated in its entirety in Figure 1 by the reference numeral 285. The hopper 162 communicates with and forms a part of the hopper 286 of the wagon elevator, and the latter includes a conveyor chain 287 having flights 288 secured thereto. The wagon elevator 285 also includes suitable sides 291 and 292, together with a bottom 293 over which the upper run of the elevator chain moves. The lower part of the elevator chain 287 is trained over a sprocket (not shown) carried on a shaft 294. To the outer end of the latter a drive sprocket 295 is fixed, and a sprocket chain 296 is trained over the sprocket 295 and over a driving sprocket 297 (Figure 3) that is fixed to the inner end of the fan shaft 168. Suitable manually controlled clutch mechanism connects the driving sprocket 295 to the shaft 294 so that the wagon elevator, which is normally driven from the fan shaft 168, may be thrown out of gear to inoperative position whenever desired, as when turning at the end of a row.

As will be seen in Figure 1, the wagon elevator extends rearwardly from the tractor substantially centrally thereof while the picker unit is disposed on the left side of the tractor. When using only the left hand picker unit, the weight of the wagon elevator is supported by the picker unit and by suitable framework, which is rigidly fastened to and moves with the picker unit, as will now be described. A frame angle 301 is fixed at one end to the husking unit 140 preferably underneath the main frame angles 5 and 6, and at the other end the angle 301 is fixed to a rear end of a triangular framework 303 consisting of an upper angle 304 and bars 305 and 306 fixed to the angle 304 and apertured to receive a clamping bolt 308, the lower end of the bars 306 receiving a pivot bolt 309 about which the entire framework 303 may swing. The pivot bolt 309 is carried at the upper end of a bracket 312, the lower portion of which is provided with keyhole slots (not shown) to receive clamping bolts by which the bracket 312 may be fixed to lugs 313, preferably identical with the lugs 216 mentioned above, carried on the forward side of the tractor rear axle housing. The upper portion of the bracket 312 has laterally extending lugs 314 which are bolted to the upper part of an inverted L-shaped angle bracket 317 (Figure 6), the lower end of which is also provided with keyhole slots to receive clamping bolts 318 by which the bracket 317 is fixed to the rear axle housing lugs 319 (Figure 3). A diagonal brace 320 is connected at one end to the angle 304 and at the other end to the angle 301, as best indicated in Figure 1. A pair of angles 321 and 322 extend downwardly from their points of attachment to the transverse angle 301, and each at its lower end carries a bracket 324 which receives the lower end of the wagon elevator 285 and serves to pivotally support the latter about the horizontal axis that coincides with the shaft 294 that drives the elevator chain 287. A brace rod 326 (Figure 3) extends from the angle 321 to the right hand frame angle 6, and a similar brace 327 extends from the other wagon elevator support angle 322 to the framework 303.

The rear part of the picker unit is supported on the rear axle 181 of the tractor for movement about a transverse pivot axis. To this end, a pair of pivot brackets 331 and 332 (Figures 2, 3 and 9) are fixed, respectively, to the main frame angles 5 and 6. Preferably, each of the pivot brackets 331 and 332 is bolted at 334 to an angle 335 which, in turn, is bolted or otherwise secured, as at 336, to the horizontal flange of the associated frame angle, as best shown in Figure 9. The lower end of each of the pivot brackets 331 and 332 carries a U-shaped strap 338 which forms a pivot receiving socket. Brace angles 341 and 342 extend forwardly from the lower portions of the brackets 331 and 332 to the forward parts of the attaching angles 335, thereby forming a rigid and sturdy connection between the pivot brackets 331 and 332 and the frame of the picker unit.

Referring again to Figures 6, 7 and 8, it will be seen that a pair of annular grooves 351 and 352 are formed in the right and left hand ends of the drive housing 191, and these grooves are adapted to receive the U-shaped sockets 338 at the lower ends of the pivot brackets 331 and 332, respectively. As best shown in Figure 2, when the picker unit is mounted on the tractor with the sockets 238 supported on the drive housing 191, it will be seen that the picker unit as a whole is capable of vertical pivotal movement about the transverse axis defined by the grooved portions 351 and 352 of the housing 191. This axis coincides with the pivot bolt 309 (Figure 3) about which the triangular framework 303 is adapted to pivot. Thus, whenever the picker unit as a whole swings about the axis of the mounting grooves 351 and 352 the framework 303 has similar movement so that the lower end of the wagon elevator, together with its supporting framework, including the angles 301, 331 and 322 and the parts 303, move bodily with the picker unit.

The means for supporting a major portion of the weight of the picker unit independently of the tractor and the mechanism for swinging the picker unit will now be described.

Referring now more particularly to Figures 2, 4 and 9, it will be seen that while the rear portion of the picker unit is supported on the pivot brackets 331 and 332 for pivotal movement about a transverse axis, as at 201 (Figure 2) and 309 (Figure 3), the weight of the forward portion of the picker unit is supported on a "knee-action" wheel unit indicated in its entirety by the reference numeral 354. As best shown in Figures 1 and 3, a beam 360 carries a pair of brackets 361 at its rear end which are bolted, as at 362, to the front end of the tractor drawbar 363. The front end of the channel beam 360 is fixed to a yoke 364 which is bolted, as at 365, to the main frame corner plates 366 which form a part of the tractor. A dual socket member 367 is carried by the channel 360 and receives the ball end of a member 369 to which a stub axle 370 is bolted, as at 371.

Journaled on the outer end of the axle 370 is a wheel 376 having a pneumatic tire 377 and supported by suitable bearing means on the axle 370. The latter is fastened by suitable brackets 381 and 382 to a pair of forwardly extending bars 383 and 384 (Figure 9) which are spaced apart at their rear ends to embrace the wheel 376 and connected together at their forward ends and mounted for pivotal movement about a pivot bolt 386 secured to a bracket 387 which is connected to the downwardly extending frame bar 10 inwardly of the rear adjustable angle brace 38. In the rising and falling movements of the wheel 376, the stub axle 370 pivots in the ball and socket connection 367, 369 with the channel beam 360.

A pair of lower balancing arms 391 and 392 are pivoted, as by bolts 394, to the brackets 381 and 382, these arms being disposed on opposite sides of the wheel 376. The upper ends of the arms are connected by means of a pivot pin 396 (Figure 4) to an upper balancing arm 397, the latter being in the form of a channel member having a lower bifurcated end (not shown) carrying a pair of bearing sleeves 398 (Figure 9) to receive the pivot pin 396. The upper end of the upper balancing spring arm 397 is pivotally connected by a suitable pivot pin 401 or other means to a pair of brackets 402 (Figures 2 and 9) and 403 (Figure 4). A balancing spring 405 is connected by a suitable yoke or other member 406 to the pivot pin 396, and at its rear end the balancing spring 405 is connected to the pivot bracket 331, preferably by means of a clip or other part (not shown) secured to the bracket 331 by a bolt 407.

The tension of the spring 405 can be adjusted in any suitable manner, so that the force exerted by the spring in tending to straighten the balancing arms 391, 392 and 397 serves to support the weight of the forward portion of the picker unit. The knee-action supporting wheel 376 is capable of relatively free up and down movement and follows the lay of the land, permitting the gatherer points 22 and 32 to run smoothly in rough conditions and do a uniformly good job of picking up the down and tangled stalks of corn but without imposing any substantial portion of the weight of the front end of the picker unit on the front end of the tractor, all but a small amount of the weight being carried by the rear axle of the tractor and the floating wheel 376.

The position of the front end of the picker unit is capable of being adjusted vertically relative to the tractor so as to permit the operator to raise or lower the gatherers to best accommodate the conditions encountered. To this end, a tilting crank 410 (Figures 1 and 3) is supported for rocking movement by suitable brackets 411 and 412 which are secured to the frame of the tractor in any suitable manner, as by bolts or the like. The bracket 411 (Figure 3) carries a notched sector 413, and at the other end the tilting crank includes an arm 414 which is pivotally connected by a link 415 (Figure 4) to a bracket 416 that is secured to the frame bars 11 and 20 of the snapping roll frame in any suitable manner, as by braces 418 and 419.

The right hand end of the tilting crank 410 has a tilting arm 421 fixedly secured thereto, the arm receiving the lower end of lever 422 to which the forward end of an angle 423 is pivoted, as at 424. The lever 422 carries a detent 425 which engages one of the notches in the sector 413 for locking the lever 422 in any adjusted position, and the detent 425 is controlled by a rod 426 which is supported for movement longitudinally on the angle 423. The rear end of the latter is pivoted to an adjusting lever 428 by a pivot bolt 429, and the adjusting lever 428 is mounted for rocking movement on a pivot 431 carried by a bracket 432 that is secured in any suitable manner to the tractor. The detent control rod 426 is connected by suitable link with a hand grip 433 carried at the upper handle end of the adjusting lever 428. Thus, releasing the detent 425 by swinging the hand grip 433 permits the lever 424 to be swung about its pivot 431 to exert a raising or lowering force through the arm 414 and the link 415 against the forward portion of the picker unit. The spring 405, which substantially balances the weight of the picker unit, makes it very easy to raise and lower the picker through the hand lever 428.

Due to the fact that when the hand lever 428 is actuated to raise and lower the front end of the picker unit, the latter swings as an entire unit about the axis defined by the drive housing extensions 351 and 352 (Figure 7) and the pivot bolt 309 (Figure 3) and due to the fact that the framework 301, 303 supporting the wagon elevator 285 is rigidly fastened to the frame of the picker unit, it is desirable that a swinging connection to be established between the lever 422 and the framework 303 in order that the latter and the angle 301 (Figure 1) may be swung as a unit with the picker frame. To this end, a link 435 is connected at its forward end to a pivot 436 spaced from the axis 410 of the lever 422 and at its rear end the link 435 is connected to a pivot 438 carried at the forward end of the upper angle 304 of the framework 303. The pivot 436 is spaced a required distance from the axis 410 so that whenever the lever 422 is actuated to raise and lower the pivot, the framework 303 is moved about its pivot 308 a corresponding amount so as to cause the wagon elevator supporting framework to swing rigidly with the picker unit. Preferably, the upper end of the wagon elevator 285 is rigidly connected to the picker frame bar 6 and the angle 304 by rods (not shown) so that the entire wagon elevator swings as a unit with the picker unit when the lever 428 (Figure 3) is actuated.

The picker unit is held against lateral displacement relative to the tractor body by means of a transversely disposed link 440 (Figure 1), one end 441 of which is bent to provide a pivotal connection with a standard 442, fixed to the tractor body on the side opposite the picker unit. The link 440 extends across the top of the tractor and the other end 443 of the link is bent to form a pivotal connection with the arch angle 7 of the picker frame 3. Thus, the link is free to swing in a transverse vertical plane as the frame 3 is raised and lowered through the crank 410, but holds the frame generally parallel to the tractor in all positions of vertical adjustment.

The wagon or other container under which the picked and husked ears of corn is discharged by the wagon elevator 285 is connected to be drawn by the tractor T in the proper position to receive the ears discharged from the elevator 285. A wagon hitch construction, indicated in its entirety by the reference numeral 450 (Figure 1), is fixed to the tractor so as to provide means to which the front end of the wagon pole may be connected. Referring now more particularly to Figures 1, 3 and 6, a pair of angles 451 and 452 are secured at their rear ends, as by welding or the like, to a hitch plate 453. At its forward end the inner angle 451 is bolted, as at 455, to the swinging drawbar guide 456 of the tractor, and the forward end of the other angle 452 is securely bolted to the lower end of the attaching bracket 317. A brace 458 is also connected to the guide 456 and to the angles 451 and 452. A second brace 459 is also secured to the angles 451 and 452, as best shown in Figure 1. A tension brace 461 is bolted at its rear end to the hitch plate 453 and extends forwardly and is bolted as at 462 (Figure 6), to the upper horizontal section of the anchoring bracket 317. The pole or tongue of the wagon is indicated at 464 and is pivoted to the hitch plate 453 by a short bar 465. There is sufficient looseness at the short bar 465 (Figure 1) to permit the required amount of vertical swinging movement of the wagon tongue or pole 464 relative to the wagon hitch frame 450.

The operation of the machine as so far described is substantially as follows:

The tractor T with the corn picker unit attached thereto as indicated in Figures 1, 2 and 3, is driven down the row of corn to be picked so that the gatherer points 22 and 32 are on opposite sides of the row, thus guiding the stalks in between the snapping rolls 50 and 51. The position of the gatherer points and the front end of the corn picker is controlled by moving the hand lever 428 (Figure 3) to any position desired. However, the weight of the machine is not imposed to any substantial extent upon the crank arm 414 but, instead, the principal portion of the weight of the machine is sustained by the floating wheel 376 and the balancing arms 391, 392 and 397 which are biased by the relatively heavy spring 405. The irregularities in the ground are accommodated by the freedom of movement of the wheel 376, the spring 405 supporting the weight of the picker unit in practically any position on the wheel. Thus, the position of the gatherer points 22 and 32 is determined largely by the front tractor wheels and the position of the adjusting lever 428, but the weight of the picker unit as a whole is supported on the floating wheel 376 and the pivot connection between the unit and the rear axle of the tractor afforded by the rigid pivot brackets 331 and 332.

Power driven from the tractor power takeoff shaft 182 is delivered by the chain 184 to the main shaft 189 (Figure 8) from which the power is transmitted by the shaft 60 (Figure 2) to the gears in the drive gear housing 55 (Figure 4) and then to the snapping rolls 50 and 51. The chain 87, which is driven by one of the snapping roll shafts, drives the countershaft 82 which, in turn, drives the inside gatherer chains through the sprocket chain 81 (Figure 4) and the gears within the housing 69. The outer gatherer chain is driven by the shaft 93 (Figure 2) and the gearing enclosed within the housing 92, the shaft 93 being driven by a sprocket chain 95 and the driving sprocket chain 97 which extends underneath the picking rolls and first elevator 100. This is an important feature of the present invention because disposing the cross drive from the right hand or inner gathering chains to the left hand gathering chains under the picker unit, places the cross chain in a position that does not interfere with the corn stalks as the machine passes down a row. The elevator chain 107 is driven by suitable connection at the lower end of the shaft upon which the drive sprocket 91 for the left hand or outside gatherer chain 67 is fixed.

The drive for the husking rolls, husk and silk conveyor, and ear retarder is taken from the auxiliary drive shaft 201 (Figure 8) by the chain 251 (Figure 2) which also drives the fan 165. The latter, in turn, drives the wagon elevator through the chain 395, and the shaft 254 which drives the husking rolls also drives the husk and silk conveyor which, in turn, drives the ear retarder 150.

One of the features of this invention is the provision of means providing for the independent support of the corn picker as a unit upon its own wheels when it is detached from the tractor. Briefly, this is accomplished by providing an auxiliary wheel alongside but spaced laterally of the knee-action wheel 376 and suitable jack braces for rigidly connecting the picker frame to the stub axle upon which the knee-action wheel and the auxiliary wheel are journaled.

Referring now to Figure 9, the transport devices for the picker unit include a pair of transport jack angles 501 and 502. The jack angle 501 includes an L-shaped rod 503, the vertical arm which is welded, as at 504, to the lower end of the angle 501, and to the upper end of the latter a threaded rod 505 is welded, as at 506. A bracket 508 is secured by bolts 509 to the horizontal flange of the frame angle 5 and the outer end of the bracket 508 is apertured to receive the threaded end of the rod 505. Nuts 510 are disposed on opposite sides of the bracket 508. The end of the jack angle bracket 503 preferably is placed in an opening 512 (Figure 2) at the rear end of the drawbar 383. The other jack angle 502 is constructed similar to the jack angle 501 just described and is assembled in a similar manner when the picker is to be removed from the tractor. In mounting the jack angle 502, however, the lower threaded end 505' is inserted in an opening in the stub axle angle 370 and the hook end of the angle 502 is inserted in a bracket on the frame. Nuts 510' serve to fix the lower end of the jack angle 502 to the stub axle 370.

A storage wheel unit indicated in its entirety by the reference numeral 520 is provided for the picker. The unit 520 includes a wheel 521 mounted on an axle 522 that is carried at the lower end of a bar 523. The upper end of the latter is fixed to a square shank 524 that is adapted to be inserted in the stub axle angle 370 after the latter has been detached from the ball member 369 (Figure 1). The storage wheel unit 520 is reenforced by a brace 526 which extends from the lower end of the bar 523 to the shank 524. A brace 530 is bolted at its lower end, as at 531, to the stub axle angle 370 and the upper end is bolted to the jack angle 501. A diagonal brace 533 is bolted to the bar 523 and extends forwardly to the left hand snapping roll frame angle 10 (Figure 4) and is bolted thereto, as indicated at 534.

A balancing angle 541 is provided with a foot 542 at its lower end and a plurality of openings 543 at its upper end. A bolt 544 is used to fasten the upper end of the balancing angle 541 to a bracket 545 fastened to the main frame angle 5. The balancing angle 541 is disposed inwardly of guide angle 546 which is bolted to the upper part of the snapping roll frame angle 10 and to an adjacent part of the first elevator, as indicated at 547. A bracket 548 is secured to the horizontal flange at the snapping roll frame angle 10 to receive the balancing angle 541.

The mechanism just described forms the means by which the picker may be supported on its own wheels and moved into or away from a position to permit attaching or detaching the unit from the tractor. Assuming that the picker unit has been in storage with the supporting wheels arranged as indicated in Figure 9 and it is desired to attach the picker unit to a tractor to begin operations, the picker unit is wheeled out into an open space large enough to accommodate maneuvering of the tractor. The picker unit may be wheeled by one man grasping the gatherer points 22, the wheels 376 and 521 being so disposed that the machine is substantially balanced fore and aft, the knee-action wheel 376 supporting practically all of the weight of the implement. The balancing bar 541 is usually attached so that the foot 542 clears the ground, the purpose of the angle bar 41 being to prevent the unit from tipping over to the left during transport or when the unit is in storage.

With the unit out into the open, the jack angle adjusting nuts 510 and 510' are turned so that the picker frame is elevated a sufficient distance to bring the pivot sockets 338 (Figure 9) above the level of the corresponding housing sections 351 and 352 (Figure 7). The housing 191 and associated drive connections are mounted on the tractor, if they are not already secured in place thereto, and then the tilting crank 410, adjusting lever 428 and associated parts are fixed to the tractor, together with the radiator shield 550 (Figure 1). Then the yoke 364 is secured to the tractor frame angles 466 and channel 360 bolted to the tractor at 362 and to the yoke 364. The ball member 369 is then bolted in the socket 367 and to the stub beam angle 370. Then the tractor is driven into the picker unit and maneuvered until the housing grooves 351 and 352 are below the sockets 338. The nuts 510 and 510' are then turned so as to lower the unit until the sockets seat in the grooves 351 and 352. When the weight of the rear portion of the picker unit rests on the drive housing 191 of the tractor, the pins 549 (Figure 9) are inserted, which holds the unit against upward movement away from the tractor.

After the picker unit has been seated on the supporting housing 191 therefor, then the link 415 (Figure 4) on the picker unit is connected to the crank arm 414 of the tilting crank 410. Next, the transport wheel unit 520, the brace 533, the balancing angle 541, and the jack angles 501 and 502 are removed, which imposes the weight of the picker unit on the knee action wheel 376 through the spring 405 and the balancing bars 391, 392 and 397.

Next, the wagon elevator 285 and supporting angle members 301 and 303 are attached to the rear axle 181 and to the rear portion of the tractor frame, and lastly the tilting connection 435 and associated parts are assembled and secured and connected in place. The wagon is attached by connecting its pole or tongue 464 to the hitch plate 453 through the short bar 465.

When it is desired to detach the picker unit from the tractor substantially the reverse of the above detailed operations is performed.

First, the wagon elevator 285 and support assembly 301, 303 are detached from the rear end of the picker at the right side of the tractor. Next the ball arm 369 is removed from the stub axle 370 and the beam or channel 370 and the supporting yoke 364 is detached from the tractor or turned up out of the way. Then the storage wheel unit 520 is attached in position as shown in Figure 9. The jack angles 501 and 502 are then connected in place and the brace angle 530 attached. Next the diagonal brace angle 533 is bolted to the storage wheel unit 520 and to the snapping roll frame angle 10. Then the balancing angle 521 is inserted through the bracket 548 and bolted, as at 544. Then the tilting connections are removed and lastly the pins 549 (Figure 9) are removed and the nuts 510 and 510' turned so as to raise the sockets 338 away from the drive housing 191. The tractor can then be backed out of the picker.

As mentioned above one of the advantages of a corn picker unit constructed and described above is that the unit is mounted on the left side of the tractor leaving the tractor pulley free for use in performing such services as grinding, shelling corn, sawing wood or other belt work without requiring that the picker be removed from the tractor. Further, the construction of the picker is such that practically no weight is added to the front end of the tractor and all but a small amount of the weight is carried by the rear axle of the tractor and the knee action wheel 376. This relieves the tractor of excessive wear and tear and, furthermore, insures easy steering and permits operating successfully in rough ground. Further, it requires very little effort to raise and lower the gatherer points or the front end of the picker unit by the convenient tilting lever which is on the side of the tractor opposite the picker unit.

Another of the important features of this invention is the provision of suitable mounting and operating connections for the one row picker unit, described above, that accommodates the installation of a right hand one row picker unit on the other side of the tractor so as to form a two row picker. This is an advantage, not only in manufacture where a right and left hand picker unit may be made up largely of standardized and identical parts, but it also permits a farmer to buy first a one-row picker and then later to add the other unit to make a two-row picker, whereas formerly the two-row pickers were furnished only as a complete machine, thus requiring the farmer who desired to change over from one-row operation to two-row operation to dispose of, turn in or discard his one-row unit.

Referring now to Figure 10, it will be seen that the right hand picker unit, indicated in its entirety by the reference character R, is substantially of the same construction as the picker unit L described above except that where necessary the parts are made right and left hand, and in Figure 10 the right hand parts corresponding to the left hand parts are indicated by the same reference numeral with the suffix a; identical parts are indicated by the same reference numerals. The inner gatherers for the two units L and R are supported at their lower ends upon a suitable framework to move together and are equipped with a central shield 601 provided with central apertures 602 to provide for a movement of cooling air to the radiator of the tractor T. The front portion of the right picker unit R is provided with a link 415 which is pivoted to a right hand tilting arm 602 which is fixed to the right hand end of the tilting crank 410 (Figure 3) and formed with suitable means to receive the lower end of the lever 422. Thus, movement of the adjustment lever 428 raises and lowers both of the picker units in the two row unit. The cross angle 301a is supported from the rear part of the left and right hand husking units 140 and 140a, and the wagon elevator 285 is supported as described above on the angle members 321 and 322. The right hand husking unit 140a discharges into a right hand elevator hopper 162a from which the ears of corn from the right hand picking unit are delivered into the wagon elevator.

When a two-row machine is used, preferably the wagon receiving the husked ears of corn from the elevator 25 is drawn by a direct connection extending from the pole or tongue of the wagon to the drawbar of the tractor, indicated at 604 in Figures 1, 3 and 10.

The drive for the right hand unit includes a right hand driving sprocket chain 184a which is trained over a sprocket 183a (Figure 7) mounted on the tractor power takeoff shaft 182 alongside the driving sprocket 183. The right hand picker unit is supported for pivotal movement on a drive housing which is similar to the drive housing 191 but arranged for mounting on the right side of the tractor. Similarly, the brackets connecting the drive housing to the right side of the tractor are similar to the corresponding brackets 213 and 226 described above as adapted for mounting on the left side of the tractor. When using both right and left hand picking units, the wagon hitch frame indicated at 450 in Figure 1 and associated parts are removed and the pole or tongue of the wagon connected directly to the tractor drawbar by the bar 604.

Also, it is not necessary to provide transport wheels, such as the one indicated at 521 in Figures 4 and 9, since the two-row machine is stable on its two knee-action wheels 376. However, when removed from the tractor, the right and left stub axles 370 are bolted at their inner ends to a rigid bar. In the two-row machine it is not necessary to provide two jack angles 501 and 502 (Figure 9) for each unit; instead, the two outer jack angles 501 and the braces 530 are adequate to lock the balancing arms 391, 392 and 397 of the two picker frames against movement relative to their two supporting wheels 376 and to provide for raising and lowering the picker frames relative to the tractor.

While we have shown and described above the preferred structure in which the principles of the present invention have been embodied, it is to be understood that our invention is not to be limited to the specific means shown and described above, but that, in fact, widely different means may be employed in the practice of the broader aspects of our invention.

What we claim, therefore, and desire to secure by Letters Patent is:

1. A two-row corn picker adapted to be mounted on a tractor having a power takeoff shaft, comprising two substantially similar right and left hand picking units, a drive housing fixed to the left end of the tractor rear axle housing and having transversely extending means forming a pivot to receive the left hand picker unit, a driving connection from said takeoff shaft to said left hand drive housing, driving means extending from said driving housing to the left hand picker unit, a right hand drive housing rigidly supported on the right end of the tractor rear axle housing and including transversely extending means in line with said first transversely extending means and providing a pivot support for the right hand picker unit in line with the left hand picker unit, and common means for raising and lowering both of said units about their common axis.

2. A corn picker construction comprising a first picker unit including a main frame and operating mechanisms carried thereby, means on one side of the tractor for receiving said picker unit and providing for generally vertical tilting movement of the latter relative to the tractor, a tilting crank carried by the tractor and having a link connection to the forward portion of said picker unit, and means disposed on the other side of the tractor for actuating said tilting crank, a centrally disposed wagon elevator arranged at the rear of the tractor, a generally longitudinally disposed frame carried at said other side of the tractor and mounted for tilting movement thereon about an axis that coincides with the axis of tilting movement of said picker unit, a transverse member supported on the rear end of said picker unit and on said longitudinally disposed frame for supporting said wagon elevator, a link connection between said longitudinally disposed tilting frame and said tilting crank whereby movement of the latter to raise and lower the front portion of said picker unit causes a corresponding movement of said elevator-supporting member, and a second picker unit adapted to be disposed on said other side of said tractor, mounting means for the second picker unit adapted to replace said longitudinally disposed tilting frame and arranged to connect said second picker unit to the tractor for tilting movement about the same transverse axis as said longitudinally disposed tilting framework, means for supporting said wagon elevator supporting member on the rear portion of said second picker unit, and means connecting the front end of said second picker unit to said tilting crank, whereby movement of the latter raises and lowers the front ends of both said picker units.

3. In a tractor-mounted corn picker, a single row picker unit, a spring biased wheel connected with said picker unit for supporting a major portion of the weight thereof when the picker unit is attached to the tractor, and auxiliary means cooperating with said wheel for supporting the picker unit in upright position when detached from the tractor, comprising a detachable leg attached to said unit and inclined outwardly therefrom at one side of said wheel.

4. A tractor-mounted corn picker unit as defined in claim 3 wherein the auxiliary supporting means further includes a transport wheel detachably connected with the picker unit at the other side of said supporting wheel to prevent the picker unit from tilting laterally toward that side and providing for moving the picker unit by hand when detached from the tractor.

5. In a tractor mounted corn picker, a single row picker unit comprising a main frame, a supporting wheel disposed substantially vertically underneath the central portion of the picker unit, spring biased balancing arms pivotally connecting the wheel to the main frame of the picker unit for imposing at least a portion of the weight of the unit thereon when attached to the tractor, and transport means cooperating with said wheel for supporting said picker unit in upright position when detached from the tractor, comprising means for locking said balancing arms against movement relative to the picker frame, an auxiliary detachable transport wheel, and means connecting the latter to the picker unit in laterally spaced relation with respect to said supporting wheel.

6. The combination with an agricultural implement adapted to be mounted on a tractor and including means connecting the frame of the implement to the tractor, wheel means separate from the tractor, means for movably connecting the wheel means with the implement frame, and means for applying a yielding upthrust through said connecting means against said frame, of transport means for supporting said implement in upright position when detached from the tractor, comprising a pair of jack members adapted to fix said connecting means against movement, due to either the weight of the implement or the force of said upthrust applying means, an auxiliary transport wheel, and detachable means adapted to rigidly connect said transport wheel to said implement so that the latter may be supported when detached from the tractor in stable position on said wheel means and the auxiliary transport wheel.

7. The combination as set forth in claim 6 wherein a diagonal bracing bar extends from said auxiliary transport wheel to the implement frame.

8. A tractor mounted corn picker comprising a main frame mounted for generally vertically swinging movement on one side of the tractor, a transverse tilting crank supported for rocking movement on the tractor, means connecting one end of the tilting crank with said main frame whereby rocking movement of the tilting crank raises and lowers said frame, an operating lever for said tilting crank disposed on the other side of the tractor, a supporting framework pivotally mounted on said other side of the tractor for movement about an axis that coincides with the axis of vertical movement of the picker unit, a bracing link extending from said supporting framework to said operating lever and connected with the latter at a point such that for a given movement of said tilting crank the supporting framework and the rear portion of said picking unit move through substantially the same angle, and a wagon elevator having a hopper for receiving ears of corn from said picking unit and supported on the rear end of said main frame and on said supporting framework.

9. The invention as set forth in claim 8 wherein bracket means is secured to the rear axle at said other side of the tractor for pivotally receiving said supporting framework, and a wagon hitch frame connected to said bracket means, said hitch frame being adapted to draw a wagon in a position to receive ears of corn discharged from said wagon elevator.

10. In a corn picker adapted to be mounted on a tractor having a rear axle and a power takeoff shaft, a drive housing including a drive shaft journaled for rotation in said housing and extending therefrom at one end, a pair of brackets fixed to opposite sides of the rear axle and supporting said housing in rigid relation, and a driving connection between the tractor power takeoff shaft and said drive shaft.

11. A corn picker adapted to be mounted on a tractor having a power takeoff, comprising a main frame, operating mechanisms carried thereby, bracket means supporting said main frame on said tractor for tilting movement about an axis, and driving mechanism operatively connected with the power takeoff shaft and including a part mounted for rotation about the axis of tilting movement of the picker unit.

12. A corn picker adapted to be mounted on a tractor having a power takeoff shaft, comprising a main frame, a snapping roll unit carried at the forward end thereof, other operating mechanism supported on said main frame, a drive housing adapted to be carried rigidly on said tractor and including a forwardly extending drive shaft and a transverse drive shaft geared to rotate with said first drive shaft, means for mounting said main frame for tilting movement on said drive housing along an axis that coincides with the axis of rotation of said transverse drive shaft, means for driving said first drive shaft from the power takeoff shaft of the tractor, means including a telescopic drive shaft having universal joint connections with said first drive shaft for driving said snapping roll unit, and means carried by the picker unit for driving said other operating mechanism from said transverse drive shaft.

13. A tractor mounted corn picker unit comprising a main frame having a forwardly disposed snapping roll frame, a plurality of snapping rolls carried thereby, a housing secured to said snapping roll frame, gear means within said housing for driving said snapping rolls, a drive housing fixed to the rear axle of said tractor, the latter having a power takeoff shaft, a main shaft journaled for rotation in said drive housing, means for driving said main shaft from said power takeoff shaft, and a drive shaft extending from said main shaft to said gear housing for driving said snapping roll ears.

14. A tractor mounted corn picker unit comprising a main frame having a forwardly disposed snapping roll frame, a plurality of snapping rolls carried thereby, a housing secured to said snapping roll frame, gear means within said housing for driving said snapping rolls, a countershaft journaled for rotation on said snapping roll frame, means for driving said countershaft from one of snapping roll shafts, a plurality of gatherer chains supported on said snapping roll frame, and means driven from said countershaft for driving said gatherer chains.

15. In a corn picker, a snapping roll frame, a pair of snapping rolls journaled thereon, a drive housing supported on said frame and receiving the upper ends of said snapping rolls, gear means enclosed within said housing for driving said snapping rolls, a countershaft journaled for rotation at one side of said snapping roll frame, means for driving said countershaft from one of said snapping rolls, a gatherer chain on each side of said snapping roll frame, means for driving the gatherer chain at said one side of the snapping roll from said countershaft, and means for driving the gatherer chain at the other side of said snapping roll frame from said countershaft, including a cross chain disposed underneath said gear housing and protected thereby from contact with stalks of corn and the like.

16. A corn picker adapted to be mounted on a tractor having a power takeoff shaft, comprising a main frame, snapping roll and gatherer chain units supported for operation of the forward part of said frame, a husking roll unit at the rear end of said main frame, a drive housing adapted to be secured to the tractor and including a main shaft journaled therein, means driving said main shaft from said power takeoff shaft, means extending forwardly from said main shaft for driving said snapping roll and gatherer chain units, a transverse shaft supported in said housing and driven from said main shaft, and means for driving said husking roll unit from said transverse shaft.

17. A corn picker as defined in claim 16 wherein the husking unit includes a fan driven by the means that drives the husking roll unit from said transverse shaft.

18. A combination set forth in claim 16 wherein the husking unit includes a fan driven from the means that drives the husking rolls from said transverse shaft, and a wagon elevator carried at the rear of the tractor and including driving connections driven from said fan.

19. A two-row corn picker adapted to be mounted on a tractor having a power lift shaft extending from the rear axle thereof, said corn picker comprising right and left hand picker units, a pair of drive housings supported adjacent the right and left hand portions of the rear axle of the tractor, driving means for the right and left hand picker units mounted within the right and left hand drive housings, respectively, and including shafts extending rearwardly therefrom, a pair of driving sprockets fixed to the power takeoff shaft of the tractor, and separate driving chains extending, respectively, from said drive sprockets to the shafts that extend rearwardly from said drive housings.

20. In combination with a tractor, a one-row picker unit comprising a main frame disposed alongside the tractor and having gathering mechanism supported on the forward portion of said frame, means near the rear of the tractor for pivotally supporting said frame thereon for vertical swinging movement relative thereto, a standard fixed on said tractor on the side opposite said picker frame, and a transversely extending link connected between said frame and said standard and swingable vertically with the frame for holding the latter against lateral displacement relative to the tractor.

21. In combination with a tractor, a one-row picker unit comprising a main frame disposed alongside the tractor and having gathering mechanism supported on the forward portion of said frame, means near the rear of the tractor for pivotally supporting said frame thereon for vertical swinging movement relative thereto, a crank arm supported beneath said tractor and connected with said frame, lifting means connected to said crank arm for swinging the latter to raise and lower said frame about said pivotal supporting means, and a transversely extending link disposed above said rock shaft and connected between said frame and the tractor for vertical swinging movement to prevent lateral displacement of said frame relative to the tractor.

22. An implement adapted to be mounted on a tractor having a power take-off, comprising in combination, a frame, operating mechanism carried thereby, a drive housing adapted to be rigidly supported on the tractor, bracket means fixed to said frame and journaled on said housing for supporting the implement for tilting movement relative to the tractor, a power shaft journaled in said housing, and power connections from said shaft to said power take-off and said operating mechanism.

23. A tractor mounted implement comprising in combination, a main frame disposed in fore and aft extending relation to the tractor, operating mechanism carried thereby, a drive housing rigidly mounted on the tractor, a transversely disposed power shaft journaled in said housing, bracket means fixed to said frame and embracing a portion of said housing providing for vertical swinging movement of said implement about an axis coincident with the axis of rotation of said power shaft, means for driving said shaft from the tractor power take-off, and power transmitting connections between said power shaft and said operating mechanism.

24. For use with a tractor including a relatively narrow, longitudinally extending body carried on front dirigible wheels and having laterally extending rear axle housings and a traction wheel journaled at the outer end of each housing, an implement comprising a longitudinally extending frame disposed between the tractor body and one of said traction wheels, a drive housing mounted on said axle housing and including a transversely disposed cylindrical section, means journaled on said cylindrical section for supporting said implement frame on said drive housing providing for swinging movement of said frame about a transverse axis, a power shaft journaled within said drive housing for rotation about an axis coincident with the axis of said cylindrical section, operating mechanism carried on said frame and connected to receive power from said shaft, and means for driving said shaft from the tractor engine.

25. An implement adapted to be mounted on a tractor having a power take-off, comprising in combination, a frame, operating mechanism carried thereby, a drive housing adapted to be rigidly supported on the tractor, said housing comprising a pair of housing sections disposed generally at right angles to each other, a pair of power shafts journaled in said sections, respectively, bevel gear means for interconnecting said shafts, means connecting one of said shafts to the tractor power take-off for receiving power therefrom, means connecting the other shaft to said operating mechanism, and bracket means fixed to said frame and journaled on one of said housing sections for supporting the implement for tilting movement relative to the tractor.

26. A tractor mounted implement comprising in combination, a main frame disposed in fore and aft extending relation to the tractor, operating mechanism carried thereby, a drive housing rigidly mounted on the tractor, a transversely disposed power shaft journaled in said housing, a second power shaft journaled in said housing and disposed generally at right angles to said transversely disposed shaft, means within said housing interconnecting said shafts to transmit power therebetween, bracket means fixed to said frame and journaled on said drive housing providing for swingably supporting the implement for movement about an axis coincident with the axis of rotation of said transverse shaft, a power transmitting connection between said last mentioned shaft and said operating mechanism on the implement, and means for driving the other of said shafts from the tractor power take-off.

27. For use with a tractor including a relatively narrow, longitudinally extending body carried on front dirigible wheels and having laterally extending rear axle housings and a traction wheel journaled at the outer end of each housing, an implement comprising a longitudinally extending frame disposed between the tractor body and one of said traction wheels, a drive housing mounted on said axle housing and including a transversely disposed cylindrical section and a fore and aft extending section, means journaled on said cylindrical housing section for supporting said implement frame on said drive housing providing for tilting movement of said frame about a transverse axis, a pair of power shafts journaled in said housing, one of said shafts being disposed coaxially with the tilting axis of the implement and the other of said shafts being disposed in fore and aft extending arrangement and connected by gear means in the housing to the first mentioned shaft, each of said pair of shafts extending out of said housing, means for connecting each of the shaft extensions to said operating mechanism on said frame, and a driving connection between one of said shafts and the tractor engine.

28. The combination with an agricultural implement adapted to be mounted on a tractor and including means connecting the frame of the implement to the tractor, wheel means separate from the tractor, means for movably connecting the wheel means with the implement frame, and means for applying a yielding upthrust through said connecting means against said frame, of transport means for supporting said implement in upright position when detached from the tractor, comprising a jack member adapted to fix said connecting means against movement, due to either the weight of the implement or the force of said upthrust applying means, and including means for raising or lowering the implement frame relative to said wheel means to facilitate mounting the implement on the tractor.

29. The combination with an agricultural implement adapted to be mounted on a tractor and including means connecting the frame of the implement to the tractor, wheel means separate from the tractor, means for movably connecting the wheel means with the implement frame, and means for applying a yielding upthrust through said connecting means against said frame, of transport means for supporting said implement in upright position when detached from the tractor, comprising a pair of threaded jack members, one on each side of said wheel means, and adjustable means engaging said threaded members and cooperable therewith to raise and lower the frame relative to the wheel means.

30. In combination with an agricultural implement adapted to be mounted on a tractor and including means connecting the frame of the implement to the tractor, a supporting wheel for the implement separate from the tractor, an axle for said wheel, means connecting said axle to said implement providing for relative vertical movement therebetween, spring means for applying a yielding upthrust against the implement and reacting upon said axle, and transport means for supporting the implement in upright position when detached from the tractor comprising an auxiliary transport wheel and means for rigidly connecting the latter to said axle in laterally spaced relation to said supporting wheel.

31. The combination as set forth in claim 30, wherein said axle is tubular in shape, and said transport wheel is mounted on a support adapted to telescope within said tubular axle and to be fastened thereto for transport.

32. A tractor mounted corn picker comprising a main frame mounted for generally vertically swinging movement on one side of the tractor, a transverse tilting crank supported for rocking movement on the tractor, means connecting one end of the tilting crank with said main frame whereby rocking movement of the tilting crank raises and lowers said frame, an operating lever for said tilting crank disposed on the other side of the tractor, a supporting framework pivotally mounted on said other side of the tractor for movement about an axis that coincides with the axis of vertical movement of the picker unit, and rigidly interconnected with the main frame, a bracing link extending from said supporting framework to said operating lever and connected with the latter at a point such that for a given movement of said tilting crank the supporting framework and the rear portion of said picking unit move through substantially the same angle.

33. The invention as set forth in claim 32 wherein mechanism is supported on said supporting framework for receiving and acting upon ears of corn delivered thereto from said picking unit.

34. In combination with a tractor, a one-row picker unit comprising a main frame disposed alongside the tractor and having gathering mechanism supported on the forward portion of said frame, means near the rear of the tractor for pivotally supporting said frame thereon for vertical swinging movement relative thereto, a crank arm supported beneath said tractor and connected with said frame, lifting means connected to said crank arm for swinging the latter to raise and lower said frame about said pivotal supporting means, a standard fixed on said tractor on the side opposite said picker frame, and a link connected to said frame, extending across the top of the tractor and connected to said standard, said link being swingable vertically with said frame for holding the latter against lateral displacement relative to the tractor.

WILBUR J. COULTAS.
NORMAN F. ANDREWS.